US012676310B2

(12) United States Patent
Hoshi et al.

(10) Patent No.: US 12,676,310 B2
(45) Date of Patent: Jul. 7, 2026

(54) NEGATIVE ELECTRODE MATERIAL FOR LITHIUM-ION SECONDARY BATTERY, NEGATIVE ELECTRODE FOR LITHIUM-ION SECONDARY BATTERY, LITHIUM-ION SECONDARY BATTERY AND METHOD OF PRODUCING NEGATIVE ELECTRODE FOR LITHIUM-ION SECONDARY BATTERY

(71) Applicant: SHOWA DENKO MATERIALS CO., LTD., Tokyo (JP)

(72) Inventors: Kento Hoshi, Tokyo (JP); Yoshinori Uchiyama, Tokyo (JP)

(73) Assignee: RESONAC CORPORATION, Tokyo (JP)

(*) Notice: Subject to any disclaimer, the term of this patent is extended or adjusted under 35 U.S.C. 154(b) by 941 days.

(21) Appl. No.: 17/258,746

(22) PCT Filed: Jul. 11, 2018

(86) PCT No.: PCT/JP2018/026236
§ 371 (c)(1),
(2) Date: Jan. 8, 2021

(87) PCT Pub. No.: WO2020/012587
PCT Pub. Date: Jan. 16, 2020

(65) Prior Publication Data
US 2021/0273224 A1 Sep. 2, 2021

(51) Int. Cl.
*H01M 4/587* (2010.01)
*H01M 4/04* (2006.01)
(Continued)

(52) U.S. Cl.
CPC ......... *H01M 4/587* (2013.01); *H01M 4/0404* (2013.01); *H01M 4/133* (2013.01);
(Continued)

(58) Field of Classification Search
CPC ..... H01M 2004/027; H01M 2004/021; H01M 4/1393; H01M 4/139; H01M 4/133; H01M 4/346; H01M 4/587; H01M 4/583
See application file for complete search history.

(56) References Cited

U.S. PATENT DOCUMENTS

| | | | | |
|---|---|---|---|---|
| 6,027,833 A | * | 2/2000 | Ueda ...................... | H01M 4/583 |
| | | | | 429/231.8 |
| 2014/0093781 A1 | * | 4/2014 | Nishihara ............. | H01M 4/587 |
| | | | | 429/231.8 |

(Continued)

FOREIGN PATENT DOCUMENTS

| | | | | |
|---|---|---|---|---|
| CN | 112038610 | * | 12/2020 | ........ H01M 10/0525 |
| JP | 2000/226206 | * | 8/2000 | ............. C01B 31/04 |

(Continued)

OTHER PUBLICATIONS

English translation of JP2017091886 (Year: 2017).*

(Continued)

*Primary Examiner* — Yoshitoshi Takeuchi
(74) *Attorney, Agent, or Firm* — SOLARIS Intellectual Property Group, PLLC

(57) ABSTRACT

A negative electrode material for a lithium-ion secondary battery includes: graphitic particles having a standard deviation of degree of circularity of from 0.05 to 0.10 in a range in which a cumulative frequency of degree of circularity from a lower degree of circularity is from 10% by particle to 90% by particle in a cumulative frequency distribution with respect to a degree of circularity obtained using a flow-type particle analyzer; and carbon particles having an average degree of circularity of 0.94 or less, the average degree of circularity being obtained using a flow-type particle analyzer.

11 Claims, 1 Drawing Sheet

(51) Int. Cl.

| | |
|---|---|
| *H01M 4/133* | (2010.01) |
| *H01M 4/1393* | (2010.01) |
| *H01M 4/583* | (2010.01) |
| *H01M 10/0525* | (2010.01) |
| *H01M 4/02* | (2006.01) |

(52) U.S. Cl.

CPC ..... *H01M 4/1393* (2013.01); *H01M 10/0525* (2013.01); *H01M 2004/021* (2013.01); *H01M 2004/027* (2013.01)

(56) References Cited

U.S. PATENT DOCUMENTS

| | | | | |
|---|---|---|---|---|
| 2015/0221946 | A1 | 8/2015 | Takahata | |
| 2017/0179487 | A1* | 6/2017 | Takeda .................... | C01B 32/20 |
| 2019/0348679 | A1* | 11/2019 | Hoshi ................... | H01M 4/587 |
| 2022/0293943 | A1* | 9/2022 | Matsuo ............. | H01M 10/0525 |

FOREIGN PATENT DOCUMENTS

| | | | | | |
|---|---|---|---|---|---|
| JP | 2010-251315 | A | 11/2010 | | |
| JP | 2013-30441 | A | 2/2013 | | |
| JP | 2014-32923 | A | 2/2014 | | |
| JP | 2015-164143 | A | 9/2015 | | |
| JP | 2017091886 | * | 5/2017 | ........ | H01M 10/0525 |
| JP | 2017-142932 | A | 8/2017 | | |
| WO | 2015/152113 | A1 | 10/2015 | | |
| WO | 2018/128179 | A1 | 7/2018 | | |
| WO | WO 2020012586 | * | 1/2020 | ........ | H01M 10/0525 |

OTHER PUBLICATIONS

English translation of JP 2000/226206 (Year: 2000).*
English translation of CN 112038610 (Year: 2020).*
English translation of WO 2020012586 (Year: 2020).*

* cited by examiner

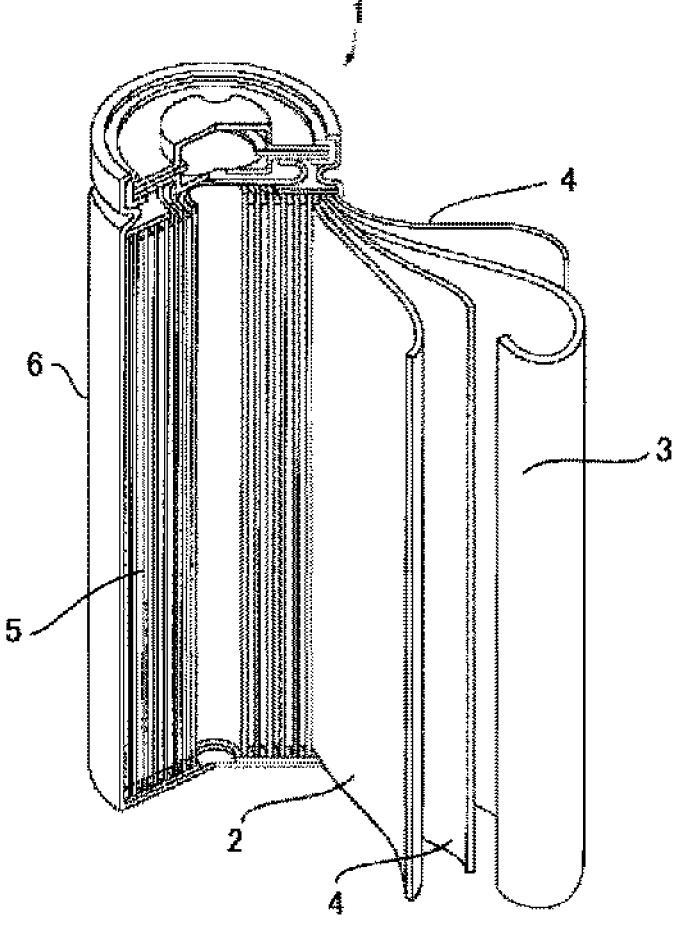

1

NEGATIVE ELECTRODE MATERIAL FOR LITHIUM-ION SECONDARY BATTERY, NEGATIVE ELECTRODE FOR LITHIUM-ION SECONDARY BATTERY, LITHIUM-ION SECONDARY BATTERY AND METHOD OF PRODUCING NEGATIVE ELECTRODE FOR LITHIUM-ION SECONDARY BATTERY

TECHNICAL FIELD

The present disclosure relates to a negative electrode material for a lithium-ion secondary battery, a negative electrode for a lithium-ion secondary battery, a lithium-ion secondary battery and a method of producing a negative electrode for a lithium-ion secondary battery.

BACKGROUND ART

Lithium-ion batteries (lithium-ion secondary batteries) are low-weight secondary batteries having high energy density. By virtue of such characteristics, lithium-ion secondary batteries are used for power supplies of portable devices such as laptop computers or mobile phones.

Nowadays, lithium-ion secondary batteries are widely used not only for consumer products such as portable devices but also for vehicles and large-scale power storage systems used in natural energy production such as photovoltaic or wind power generation. In particular, in their applications in the field of vehicles, excellent input characteristics are desired for the lithium-ion secondary batteries to improve energy utilization efficiency by regeneration. Further, long life characteristics are also desired for the lithium-ion secondary batteries.

Patent literature 1 suggests, for example, a negative electrode material for a non-aqueous secondary battery including two types of graphitic particles having different optimum Raman R values (crystallinity), one of which has an average degree of circularity of 0.9 or higher, the degree of circularity being obtained using a flow-type particle analyzer, whereby a high capacity, rapid charge-discharge characteristics and excellent cycle characteristics are obtained.

Further, cited reference 2 suggests a negative electrode material for a non-aqueous secondary battery in which graphitic particles having an average degree of circularity of 0.9 or higher and graphitic particles having a high aspect ratio are mixed, thereby exhibiting excellent charge-discharge characteristics with a low irreversible capacity.

RELATED ART DOCUMENT

Patent Document

Patent Document 1: Japanese Patent Application Laid-Open (JP-A) No. 2010-251315
Patent Document 2: Japanese Patent Application Laid-Open (JP-A) No. 2015-164143

SUMMARY OF INVENTION

Technical Problem

However, the inventors' work revealed that, although cited reference 1 mixes two types of graphitic particles to improve continuous rapid input characteristics as compared to conventional techniques, the material in cited reference 1 is not so effective in pulse charge characteristics. Further, while cited reference 2 discloses that mixing two types of graphitic particles, one of which has a high aspect ratio, can reduce the irreversible capacity, cited reference 2 is silent regarding pulse charging. Further, the inventors' work revealed that graphitic particles having a high aspect ratio is not so effective for pulse charge characteristics.

In view of the foregoing circumstances, the present disclosure is directed to provide a negative electrode material for a lithium-ion secondary battery that can be used to produce a lithium-ion secondary battery having excellent pulse charge characteristics, cycle characteristics and storage characteristics; a negative electrode for a lithium-ion secondary battery and a lithium-ion secondary battery having excellent pulse charge characteristics, cycle characteristics and storage characteristics; and a method of producing the negative electrode for a lithium-ion secondary battery.

Solution to Problem

Specific means for solving the above-described problems include the following embodiments.

<1> A negative electrode material for a lithium-ion secondary battery, the negative electrode material including:

graphitic particles having a standard deviation of degree of circularity of from 0.05 to 0.10 in a range in which a cumulative frequency of degree of circularity from a lower degree of circularity is from 10% by particle to 90% by particle in a cumulative frequency distribution with respect to a degree of circularity obtained using a flow-type particle analyzer; and carbon particles having an average degree of circularity of 0.94 or less, the average degree of circularity being obtained using a flow-type particle analyzer.

<2> The negative electrode material for a lithium-ion secondary battery according to <1>, wherein the graphitic particles have an average degree of circularity of from 0.70 to 0.91 at the cumulative frequency of 10% by particle.

<3> The negative electrode material for a lithium-ion secondary battery according to <1> or <2>, wherein the graphitic particles have a volume average particle diameter of from 2 to 30 μm.

<4> The negative electrode material for a lithium-ion secondary battery according to any one of <1> to <3>, wherein the carbon particles have a volume average particle diameter of from 0.5 to 15 μm.

<5> The negative electrode material for a lithium-ion secondary battery according to any one of <1> to <4>, wherein the carbon particles have a smaller volume average particle diameter than a volume average particle diameter of the graphitic particles.

<6> The negative electrode material for a lithium-ion secondary battery according to any one of <1> to <5>, wherein a ratio of volume average particle diameters between the graphitic particles and the carbon particles (graphitic particles:carbon particles) is from 10:0.5 to 10:5.

<7> The negative electrode material for a lithium-ion secondary battery according to any one of <1> to <6>, wherein the graphitic particles have a Raman R value of from 0.10 to 0.60, the R value representing a ratio (ID/IG) of a peak intensity observed in a range of from 1300 cm$^{-1}$ to 1400 cm$^{-1}$ (ID) to a peak intensity observed in a range of from 1580 cm$^{-1}$ to 1620 cm$^{-1}$ (IG) in Raman spectrometry, the graphitic particles being irradiated with a laser light at 532 nm.

<8> The negative electrode material for a lithium-ion secondary battery according to any one of <1> to <7>, wherein a mass ratio between the graphitic particles and the carbon particles (graphitic particles:carbon particles) is from 51:49 to 99:1.

<9> A negative electrode for a lithium-ion secondary battery, the negative electrode including:

a current collector; and a negative electrode material mixture layer disposed on a surface of the current collector, the negative electrode material mixture layer including:

graphitic particles having a standard deviation of degree of circularity of from 0.05 to 0.10 in a range in which a cumulative frequency of degree of circularity from a lower degree of circularity is from 10% by particle to 90% by particle in a cumulative frequency distribution with respect to a degree of circularity obtained using a flow-type particle analyzer; and carbon particles having an average degree of circularity of 0.94 or less, the average degree of circularity being obtained using a flow-type particle analyzer.

<10> A lithium-ion secondary battery including the negative electrode for a lithium-ion secondary battery according to <9>.

<11> A method of producing a negative electrode for a lithium-ion secondary battery, the method including:

preparing a negative electrode material mixture including:

graphitic particles having a standard deviation of degree of circularity of from 0.05 to 0.10 in a range in which a cumulative frequency of degree of circularity from a lower degree of circularity is from 10% by particle to 90% by particle in a cumulative frequency distribution with respect to a degree of circularity obtained using a flow-type particle analyzer; and carbon particles having an average degree of circularity of 0.94 or less, the average degree of circularity being obtained using a flow-type particle analyzer; and disposing the negative electrode material mixture on a surface of a current collector.

Advantageous Effects of Invention

According to the present disclosure, a negative electrode material for a lithium-ion secondary battery that can be used to produce a lithium-ion secondary battery having excellent pulse charge characteristics, cycle characteristics and storage characteristics; a negative electrode for a lithium-ion secondary battery and a lithium-ion secondary battery having excellent pulse charge characteristics, cycle characteristics and storage characteristics; and a method of producing the negative electrode for a lithium-ion secondary battery are provided.

BRIEF DESCRIPTION OF DRAWINGS

FIG. 1 is a cross-sectional view of a lithium-ion secondary battery according to an embodiment of the present disclosure.

DESCRIPTION OF EMBODIMENTS

Hereinafter, embodiments of the present invention will be described in detail. However, the present invention is not limited to the following embodiments. In the following embodiments, the constituent elements (including the element steps and the like) are not indispensable except when particularly explicitly mentioned. The same applies to numerical values and ranges, and the numerical values and ranges do not limit the present invention. Further, various alterations and modifications can be made by those having ordinary skill in the art within the scope of the technical ideas described in the present disclosure.

In the present disclosure, a numerical range specified using "(from) . . . to . . . " represents a range including the numerical values noted before and after "to" as a minimum value and a maximum value, respectively.

In the present disclosure, with respect to the numerical ranges stated hierarchically, the upper limit or the lower limit of a numerical range of a certain hierarchical level may be replaced with the upper limit or the lower limit of a numerical range of another hierarchical level. Further, in the present disclosure, with respect to the numerical ranges, the upper limit or the lower limit of a numerical range may be replaced with a value shown in the Examples.

In the present disclosure, each component may include multiple kinds of substances corresponding to the component. When multiple kinds of substances corresponding to a certain component are present in a composition, the amount or the content of the component means the total amount or the total content of the multiple kinds of substances, unless otherwise specified.

In the present disclosure, multiple kinds of particles corresponding to a certain component may be present. When multiple kinds of particles corresponding to a certain component are present in a composition, a particle diameter of the component means a value with respect to the mixture of the multiple kinds of particles present in the composition, unless otherwise specified.

The term "layer" or "film" as used herein encompasses not only a case in which the layer or the film is formed over the entire observed region, but also a case in which the layer or the film is formed on only a part of the observed region, when a region in which the layer or the film is present is observed.

In the present disclosure, a "solid mass" of a positive electrode material mixture or a negative electrode material mixture means a residual component resulting from removing a volatile component, such as an organic solvent, from the slurry of the positive electrode material mixture or the slurry of the negative electrode material mixture.

When an embodiment is described herein in reference to the Drawings, the configuration of the embodiment is not limited by the configuration illustrated in the Drawings. The sizes of members in respective figures are conceptual, and the relative relationships in the sizes of the members are not limited thereto.

<Negative Electrode Material for Lithium-ion Secondary Battery>

A negative electrode material for a lithium-ion secondary battery according to the present disclosure includes:

graphitic particles having a standard deviation of degree of circularity of from 0.05 to 0.10 in a range in which a cumulative frequency of degree of circularity from a lower degree of circularity is from 10% by particle to 90% by particle; and carbon particles having an average degree of circularity of 0.94 or less, the average degree of circularity being obtained using a flow-type particle analyzer.

The graphitic particles function as a negative electrode active material. Hereinafter, the negative electrode material for a lithium-ion secondary battery according to the present disclosure may be simply referred to as a "negative electrode material". Further, the above-mentioned range in which a cumulative frequency of degree of circularity from a lower degree of circularity is from 10% by particle to 90% by particle may simply be referred to as "the specific range".

Employing graphitic particles having a standard deviation of degree of circularity of from 0.05 to 0.10 in the specific range and carbon particles having an average degree of circularity of 0.94 or less enables production of a lithium-ion secondary battery having excellent pulse charge characteristics, cycle characteristics and storage characteristics.

(Graphitic Particles)

The graphitic particles have a standard deviation of degree of circularity of from 0.05 to 0.10 in a range in which a cumulative frequency of degree of circularity from a lower degree of circularity is from 10% by particle to 90% by particle (the specific range) in a cumulative frequency distribution with respect to a degree of circularity obtained using a flow-type particle analyzer. The graphitic particles preferably have a standard deviation of degree of circularity in the specific range of from 0.06 to 0.10, more preferably from 0.06 to 0.09, and further preferably from 0.06 to 0.08.

The degree of circularity of graphitic particles can be measured using a flow-type particle analyzer (e.g., a wet flow-type particle size/shape analyzer, FPIA-3000, Malvern Panalytical). The cumulative frequency distribution, average degree of circularity, and standard deviation of the degree of circularity in the specific range and the like can be analyzed based on the academic document of FPIA-3000 (second edition, published Aug. 31, 2006).

In the measurement, 10,000 particles are counted at a temperature of 25° C. in a measurement sample having a concentration of 10% by mass. Water is used as a dispersant.

In measuring the degree of circularity of the graphitic particles, it is preferable that the graphitic particles be dispersed in advance. For example, the graphitic particles can be dispersed using ultrasonic dispersion, a vortex mixer or the like. The intensity and the duration of the dispersion treatment may be adjusted in view of the strength of the graphitic particles to be measured, in order to reduce the impact of particle disruption or particle fracture of the graphitic particles.

The ultrasonic treatment is preferably conducted by, for example, pouring a certain amount of water in a tank of an ultrasonic washer (e.g., ASU-10D, manufactured by AS ONE Corporation) and performing an ultrasonic treatment on a test tube containing the dispersion liquid of the graphitic particles, together with a holder, for 1 to 10 minutes. When the duration is within this range, the graphitic particles tend to be dispersed with particle disruption, particle fracture, temperature rise of the sample or the like being suppressed.

The degree of circularity of the graphitic particles is not particularly limited as long as the standard deviation of degree of circularity in the specific range is 0.05 to 0.10. For example, the graphitic particles preferably has an average degree of circularity of 0.70 or higher, more preferably 0.80 or higher, and further preferably 0.85 or higher. The graphitic particles may have an average degree of circularity of higher than 0.90, higher than 0.92 or higher than 0.94. When the graphitic particles have an average degree of circularity of 0.70 or higher, continuous charge acceptance property tends to be improved.

In an embodiment, the graphitic particles may have a higher average degree of circularity than the average degree of circularity of the carbon particles described later.

The graphitic particles preferably have a degree of circularity of 0.70 to 0.91, and may have a degree of circularity of 0.80 to 0.91 or 0.85 to 0.91, at a cumulative frequency (cumulative frequency from a lower degree of circularity in a cumulative frequency distribution with respect to a degree of circularity obtained using a flow-type particle analyzer) at 10% by particle.

The volume average particle diameter of the graphitic particles is not particularly limited. The graphitic particles preferably have a volume average particle diameter of from 2 to 30 μm, more preferably from 2.5 to 25 μm, further preferably from 3 to 20 μm, and still more preferably from 5 to 20 μm. When the volume average particle diameter of the graphitic particles is 30 μm or less, discharge capacity and discharge characteristics tend to be improved. When the volume average particle diameter of the graphitic particles is 2 μm or more, the initial charge-discharge efficiency tends to be improved.

The volume average particle diameter can be measured as d50 (median diameter) by obtaining a particle diameter distribution by volume using a particle diameter distribution measurement apparatus utilizing a laser light scattering method (e.g., SALD-3000, manufactured by Shimazu Corporation).

The BET specific surface area of the graphitic particles is not particularly limited. The graphitic particles preferably have a BET specific surface area of from 0.8 to 8.0 m²/g, more preferably from 1.0 to 7.0 m²/g, further preferably from 1.5 to 6.0 m²/g. When the BET specific surface area of the graphitic particles is 0.8 m²/g or more, excellent battery performance tends to be obtained. When the BET specific surface area of the graphitic particles is 8.0 m²/g or less, the tap density tends to increase and mixability with a binder, a conductive material and the like tends to be improved.

The BET specific surface area can be measured, for example, by the nitrogen adsorption capacity according to JIS Z 8830:2013. Examples of the measuring apparatus include an AUTOSORB-1 (trade name) manufactured by Quantachrome Instruments. In measuring the BET specific surface area, it is preferable that a pretreatment of removing moisture be conducted, since moisture adsorbed on the surface or in the structure of the sample may influence the gas adsorption capacity.

In the pretreatment, a measurement cell containing 0.05 g of a measurement sample is evacuated using a vacuum pump until the pressure reaches 10 Pa or less, which is then heated at 110° C. for 3 hours or longer, and cooled naturally to ambient temperature at the reduced pressure. After performing the pretreatment, the measurement is conducted at an assessment temperature of 77K and an assessment pressure range of less than 1 in terms of relative pressure, which is an equilibrium pressure with respect to the saturated vapor pressure.

"Graphitic particles" herein refers to particles including graphite as a component and having an average interplanar spacing $(d_{002})$ of less than 0.3400 nm, the average interplanar spacing being measured using a wide angle X-ray diffraction method.

The theoretical value of the average interplanar spacing $(d_{002})$ of a graphite crystal is 0.3354 nm, the closer to which value the higher the energy density tends to be.

The average interplanar spacing $(d_{002})$ can be measured by irradiating the sample with an X ray (CuKα ray), obtaining a diffraction profile by analyzing the diffraction line using a goniometer to obtain a diffraction peak corresponding to the carbon 002 plane that appear in the vicinity of the diffraction angle 2θ=24° to 27°, and calculating the average interplanar spacing using the Bragg's equation.

The average interplanar spacing ($d_{002}$) can be measured under the following conditions.

Radiation source: CuKα ray (wavelength=0.15418 nm)
Output: 40 kV, 20 mA
Sampling width: 0.010°
Scanning range: from 10° to 35°
Scanning speed: 0.5°/min
Bragg's equation: $2d \cdot \sin \theta = n\lambda$,
wherein d is a length of one cycle, θ is a diffraction angle, n is a reflection order, and λ is a wavelength of the X-ray.

For the graphitic particles, graphitic particles obtained by grinding a lump of natural graphite may be used. It is preferable that the natural graphite be purified by a refining treatment, since the graphitic particles obtained by grinding a lump natural graphite may include impurities.

The refining treatment is not particularly limited, and may be selected as appropriate from commonly used refining treatment methods. Examples thereof include ore floatation, electrochemical treatment, and chemical treatment.

The purity of the natural graphite is preferably 99.8% by mass or more (ash content of 0.2% or less), and more preferably 99.9% by mass or more (ash content of 0.1% or less). The purity of 99.8% or more tends to further improve battery performance and the safety of the battery. The purity of natural graphite can be calculated by, for example, disposing 100 g of graphite in a furnace set at 800° C. in air atmosphere for 48 hours or longer, and measuring the amount of the remnant resulting from the ash content.

Examples of the graphitic particles also include those obtained by grinding synthetic graphite obtained by burning, for example, a resin-based material such as an epoxy resin or a phenolic resin, or a pitch-based material obtained from petroleum, coal or the like.

The method for obtaining the synthetic graphite is not particularly limited, and examples thereof include a method in which a raw material, such as a thermoplastic resin, naphthalene, anthracene, phenanthroline, coal tar, or tar pitch, is calcined in an inert atmosphere at 800° C. or more to obtain a burned product, which is synthetic graphite. The burned product is then ground by a known method, such as a jet mill, a vibration mill, a pin mill, or a hammer mill, so that the volume average particle diameter is adjusted to 2 to 40 μm, whereby graphitic particles derived from synthetic graphite can be produced. A heat treatment may be performed on the raw material in advance before the calcination. If a heat treatment is performed on the raw material, the graphitic particles derived from synthetic graphite can be obtained by, for example, performing a heat treatment in advance with a device such as an autoclave, performing coarse grinding by a known method, calcining the heat-treated raw material in an inert atmosphere at 800° C. or more in a manner described above, grinding the obtained burned product, which is synthetic graphite, to adjust the volume average particle diameter to from around 2 to 40 μm.

The graphitic particles may be reformed with a material other than graphite. The graphitic particles may include, for example, a low-crystalline carbon layer on the surface of a graphite core. When the graphitic particles have a low-crystalline carbon layer on the surface of a graphite, a ratio (mass ratio) of the low-crystalline carbon layer with respect to 1 part by mass of the graphite is preferably from 0.005 to 10, more preferably from 0.005 to 5, and further preferably from 0.005 to 0.08. When the ratio (mass ratio) of the low-crystalline carbon layer with respect to the graphite is 0.005 or more, the initial charge-discharge efficiency and life characteristics tend to be favorable. When the ratio is 10 or less, output characteristics tend to be favorable.

In a case in which the graphitic particles are reformed with a material other than graphite, the contents of the graphite and the material other than graphite that are included in the graphitic particles can be calculated, for example, based on a weight loss rate after a temperature increase from 500° C. to 600° C., obtained by measuring the weight change in air flow using TG-DTA (Thermogravimetry-Differential Thermal Analysis). The weight change in a temperature range of from 500° C. to 600° C. can be attributed to the weight change caused by the material other than graphite. On the other hand, the residual portion after the heat treatment can be attributed to the amount of graphite.

The Raman R value (ID/IG) representing a ratio of a peak intensity observed in a range of from 1300 $cm^{-1}$ to 1400 $cm^{-1}$ (ID) to a peak intensity observed in a range of from 1580 $cm^{-1}$ to 1620 $cm^{-1}$ (IG) in Raman spectrometry, when the graphitic particles are irradiated with a laser light, is not particularly limited. For example, the Raman R value is preferably from 0.10 to 0.60, more preferably from 0.15 to 0.55, and further preferably from 0.20 to 0.50.

Raman spectroscopy can be conducted using a Raman spectrophotometer (e.g., DXR manufactured by ThermoFisher Scientific Inc.).

(Carbon Particles)

The negative electrode material according to the present disclosure includes carbon particles having an average degree of circularity of 0.94 or less, the degree of circularity being obtained using a flow-type particle analyzer. In the present disclosure, the term "carbon particles" comprehensively encompasses a group of carbon particles having at least one selected from the group consisting of a different particle size distribution and a different distribution of circularity (e.g., an average degree of circularity, or a standard deviation of degree of circularity in the specific range) from those of the "graphitic particles". The material of the carbon particles may be the same as or different from the material of the graphitic particles.

Examples of the carbon particles include particles of natural flake graphite, natural graphite such as spherical natural graphite obtained by spheronizing natural flake graphite, synthetic graphite, and amorphous graphite. From the viewpoint of input characteristics, the carbon particles preferably include natural graphite.

The carbon particles has an average degree of circularity of 0.94 or less, preferably from 0.81 to 0.94, and more preferably from 0.85 to 0.92. A degree of circularity of 0.94 or less tends to improve input characteristics and cycle characteristics. Although the reason for this is not necessarily clear, this is presumably partly attributed to the fact that inclusion of carbon particles having an average degree of circularity of 0.94 or less tends to form efficient conductive paths.

The average degree of circularity of the carbon particles can be measured in the same manner as in the case of the average degree of circularity of the graphitic particles.

Regarding the carbon particles, the standard deviation of degree of circularity in a range in which a cumulative frequency of degree of circularity from a lower degree of circularity is from 10% by particle to 90% by particle in a cumulative frequency distribution with respect to a degree of circularity obtained using a flow-type particle analyzer is not particularly limited. For example, the standard deviation may be from 0.06 to 0.65, from 0.10 to 0.60, or from higher than 0.10 to 0.60.

Regarding the carbon particles, the degree of circularity at a cumulative frequency of degree of circularity of 10% by particle from a lower degree of circularity, in a cumulative frequency distribution with respect to a degree of circularity obtained using a flow-type particle analyzer, is not particularly limited. For example, the degree of circularity may be from 0.40 to 0.85, from 0.40 to less than 0.85, from 0.45 to 0.80, from 0.45 to less than 0.80, from 0.45 to 0.69, or from 0.45 to 0.65.

The volume average particle diameter of the carbon particles is not particularly limited, and is preferably from 0.5 to 15 $\mu$m, more preferably from 1 to 10 $\mu$m, and further preferably from 1 to 7 $\mu$m. A volume average particle diameter in the range of 0.5 to 15 $\mu$m tends to improve cycle characteristics by suppressing excessive degradation of electrolytic solution. The volume average particle diameter of the carbon particles can be measured in the same manner as in the case of the volume average particle diameter of the graphitic particles.

The BET specific surface area of the carbon particles is not particularly limited, and is preferably from 2 to 50 $m^2$/g, more preferably from 2 to 40 $m^2$/g, and further preferably from 3 to 30 $m^2$/g. A BET specific surface area of from 2 to 50 $m^2$/g tends to improve input characteristics by suppressing excessive degradation of electrolytic solution. The BET specific surface area of the carbon particles can be measured in the same manner as the BET specific surface area of the graphitic particles.

The carbon particles preferably has an average interplanar spacing ($d_{002}$) of from 0.3354 to 0.3400 nm, and more preferably from 0.3354 to 0.3380 nm, the average interplanar spacing ($d_{002}$) being measured by X-ray diffraction. When the average interplanar spacing ($d_{002}$) of the carbon particles is 0.3400 nm or less, both excellent initial charge-discharge efficiency and energy density of a lithium-ion secondary battery tend to be obtained.

The value of the average interplanar spacing ($d_{002}$) tends to become smaller by, for example, increasing the temperature at which a negative electrode material is produced. Accordingly, the average interplanar spacing ($d_{002}$) of a negative electrode material can be adjusted by controlling the temperature at which the negative electrode material is produced.

The carbon particles may include a carbonaceous material other than the carbon particles on at least a part of the surface thereof, as appropriate.

The Raman R value (ID/IG) representing a ratio of a peak intensity observed in a range of from 1300 $cm^{-1}$ to 1400 $cm^{-1}$ (ID) to a peak intensity observed in a range of from 1580 $cm^{-1}$ to 1620 $cm^{-1}$ (IG) in Raman spectrometry when the carbon particles are irradiated with a laser light at 532 nm is not particularly limited. For example, the Raman R value is preferably from 0.10 to 1.00, more preferably from 0.20 to 0.80, and further preferably from 0.20 to 0.70. A Raman R value of 0.10 or higher tends to suppress deterioration of input-output characteristics, since a sufficient amount of lattice defects used for intercalation and deintercalation of lithium ions tends to be present. An R value of 1.00 or less tends to restrain deterioration of the initial efficiency, since a degradation reaction of the electrolytic solution tends to be sufficiently suppressed.

The mass ratio of the graphitic particles and the carbon particles in the negative electrode material (graphitic particles:carbon particles) is preferably from 51:49 to 99:1, more preferably from 65:35 to 98:2, and further preferably from 80:20 to 95:5.

It is preferable that the carbon particles have a smaller volume average particle diameter than the volume average particle diameter of the graphitic particles. This tends to improve cycle characteristics.

The ratio of the volume average particle diameter between the graphitic particles and the carbon particles (graphitic particles:carbon particles) is preferably from 10:0.1 to 10:9, more preferably from 10:0.3 to 10:8, and further preferably from 10:0.5 to 10:5. When the ratio of the volume average particle diameter between the graphitic particles and the carbon particles is from 10:0.1 to 10:9, excellent pulse charge characteristics, cycle characteristics and storage characteristics tend to be obtained.

The fact that a negative electrode material includes graphitic particles having a standard deviation of degree of circularity of 0.05 to 0.10 in the specific range and carbon particles having an average degree of circularity of 0.94 or less can be confirmed in the following manner. The negative electrode material is separated into graphitic particles and carbon particles using an ultrasonic separator (e.g., ASU-6D, AS ONE Corporation). The obtained graphitic particles and carbon particles are examined for the standard deviation of degree of circularity in the specific range and the average degree of circularity as described above.

(Other Particles)

The negative electrode material may include particles other than the graphitic particles and the carbon particles as a negative electrode active material. For example, particles of a metal oxide such as tin oxide or silicon oxide, a metal composite oxide, simple-substance lithium, a lithium alloy such as lithium-aluminum alloy, or a material that can form an alloy with lithium, such as Sn or Si, may be used in combination. One kind of particles other than the graphitic particles and the carbon particles may be used singly, or two or more kinds thereof may be used in combination.

The metal composite oxide is not particularly limited as long as it is a metal composite oxide capable of occluding and releasing lithium, and is preferably a metal composite oxide containing Ti, Li, or both Ti and Li, from the viewpoint of discharge characteristics.

In a case in which the negative electrode material includes particles other than the graphitic particles and the carbon particles, the content of the particles other than the graphitic particles and the carbon particles is preferably from 0.5 to 20% by mass, and more preferably from 1 to 15% by mass, with respect to the negative electrode material.

<Negative Electrode for Lithium-Ion Secondary Battery>

A negative electrode for a lithium-ion secondary battery (negative electrode) according to the present disclosure includes: a current collector; and a negative electrode material mixture layer disposed on a surface of the current collector, the negative electrode material mixture layer including: graphitic particles having a standard deviation of degree of circularity of from 0.05 to 0.10 in a range in which a cumulative frequency of degree of circularity from a lower degree of circularity is from 10% by particle to 90% by particle in a cumulative frequency distribution with respect to a degree of circularity obtained using a flow-type particle analyzer; and carbon particles having an average degree of circularity of 0.94 or less, the average degree of circularity being obtained using a flow-type particle analyzer.

Examples of the graphitic particles and the carbon particles used for the negative electrode for a lithium-ion secondary battery according to the present disclosure include those described above in detail in connection with the graphitic particles and carbon particles used for the negative electrode material. Details of the current collector and the negative electrode material mixture layer will be described later.

<Lithium-Ion Secondary Battery>

A lithium-ion secondary battery according to the present disclosure is not particularly limited in terms of its configuration as long as it includes the negative electrode for a lithium-ion secondary battery according to the present disclosure. An overview of an embodiment of the lithium-ion secondary battery will be described below.

(Overview of Lithium-Ion Secondary Battery)

In an embodiment, a lithium-ion secondary battery may include a positive electrode, a negative electrode, a separator and a non-aqueous electrolytic solution in a battery container. The separator is arranged between the positive electrode and the negative electrode.

In charging the lithium-ion secondary battery, a battery charger is connected between the positive electrode and the negative electrode. During the charging, lithium ions intercalated inside the positive electrode active material are desorbed and released into the non-aqueous electrolytic solution. The lithium ions released into the non-aqueous electrolytic solution migrate in the non-aqueous electrolytic solution, pass through the separator, and reach the negative electrode. Lithium ions that have reached the negative electrode are intercalated into the negative electrode active material included in the negative electrode.

In discharging the lithium-ion secondary battery, an external load is connected between the positive electrode and the negative electrode. During the discharging, lithium ions intercalated inside the negative electrode active material are desorbed and released into the non-aqueous electrolytic solution. At this time, electrons are released from the negative electrode. The lithium ions released into the non-aqueous electrolytic solution migrate in the non-aqueous electrolytic solution, pass through the separator, and reach the positive electrode. The lithium ions that have reached the positive electrode are intercalated into the positive electrode active material included in the positive electrode. Once the lithium ions are intercalated into the positive electrode active material, electrons flow into the positive electrode active material. Discharge occurs in this manner by migration of electrons from the negative electrode to the positive electrode.

A lithium-ion secondary battery can be charged and discharged by intercalating and deintercalating lithium ions between a positive electrode active material and a negative electrode active material as described above. A detailed example of the configuration of the lithium-ion secondary battery will be described later (see, for example, FIG. 1).

Next, a positive electrode, a negative electrode, a non-aqueous electrolytic solution, a separator, and other constituent member(s) provided as necessary, which may be used in the lithium-ion secondary battery, will be described below.

(Positive Electrode)

The positive electrode (positive electrode plate) includes a current collector (positive electrode current collector) and a positive electrode material mixture layer disposed on a surface of the current collector. The positive electrode material mixture layer is a layer including at least a positive electrode active material, which is disposed on a surface of the current collector.

The positive electrode active material preferably includes a lithium nickel manganese cobalt complex oxide having a lamellar structure (hereinafter also referred to as "NMC"). The NMC tends to have a high capacity and tends to be excellent in safety.

From the viewpoint of further improving the safety, a mixture of NMC and a lithium manganese complex oxide having a spinel structure (hereinafter also referred to as "sp-Mn") is preferably used as a positive electrode active material.

From the viewpoint of increasing the capacity of the battery, the content of NMC is preferably 65% by mass or more, more preferably 70% by mass or more, and further preferably 80% by mass or more, with respect to the total amount of the positive electrode material mixture layer.

NMC represented by the following composition formula (1) is preferebly used.

$$Li_{(1+\delta)}Mn_xNi_yCO_{(1-x-y-z)}M_2O_2 \tag{1}$$

In the composition formula (1), $(1+\delta)$ represents a composition ratio of Li (lithium), x represents a composition ratio of Mn (manganese), y represents a composition ratio of Ni (nickel), and $(1-x-y-z)$ represents a composition ratio of Co (cobalt). z represents a composition ratio of element M. The composition ratio of O is 2.

The element M is at least one element selected from the group consisting of Ti (titanium), Zr (zirconium), Nb (niobium), Mo (molybdenum), W (tungsten), Al (aluminium), Si (silicon), Ga (gallium), Ge (germanium) and Sn (tin).

$\delta$, x, y and z meet the following conditions; $-0.15<\delta<0.15$, $0.1<x\leq0.5$, $0.6<x+y+z<1.0$, and $0\leq z\leq0.1$.

sp-Mn represented by the following composition formula (2) is preferably used.

$$Li_{(1+\eta)}Mn_{(2-\lambda)}M'_\lambda O_4 \tag{2}$$

In the composition formula (2), $(1+\eta)$ represents a composition ratio of Li, $(2-\lambda)$ represents a composition ratio of Mn, and $\lambda$ represents a composition ratio of element M'. A composition ratio of O (oxygen) is 4.

The element M' is preferably at least one element selected from the group consisting of Mg (magnesium), Ca (calcium), St (strontium), Al (aluminium), Ga (gallium), Zn (zinc) and Cu (copper).

$\eta$ and $\lambda$ meet the following conditions; $0\leq\eta\leq0.2$ and $0\leq\lambda\leq0.1$.

M' in the composition formula (2) is preferably Mg or Al. Use of Mg or Al tends to prolong the life of the battery. Further, the use of Mg or Al tends to improve the safety of the battery. Moreover, addition of element M' can reduce elution of Mn, thereby tends to improve storage characteristics and charge-discharge cycle characteristics.

A positive electrode active material other than NMC and sp-Mn may also be used.

Examples of the positive electrode active material other than NMC and sp-Mn include positive electrode active materials that are conventionally used, such as a lithium-containing complex metal oxide other than NMC and sp-Mn, an olivine-type lithium salt, a chalcogen compound, and manganese dioxide.

The lithium-containing composite metal oxide is a metallic oxide containing lithium and a transition metal, or a metallic oxide in which a part of the transition metal in the above metallic oxide is replaced with a different element. Examples of such a different element include Na, Mg, Sc, Y, Mn, Fe, Co, Ni, Cu, Zn, Al, Cr, Pb, Sb, V and B, and Mn, Al, Co, Ni or Mg are preferable. One kind of different element may be used singly, or two or more kinds thereof may be used in combination.

Examples of the lithium-containing complex metal oxide other than NMC and sp-Mn include $Li_xCoO_2$, $Li_xNiO_2$, $Li_xMnO_2$, $Li_xCo_yNi_{1-y}O_2$, $Li_xCo_yM^1_{1-y}O_2$, (in $Li_xCo_yM^1_{1-y}O_2$, $M^1$ represents at least one element selected from the group consisting of Na, Mg, Sc, Y, Mn, Fe, Ni, Cu, Zn, Al, Cr, Pb, Sb, V and B), and $Li_xNi_{1-y}M^2_yO_2$ (in $Li_xNi_{1-y}M^2_yO_2$, $M^2$ represents at least one element selected from the group consisting of Na, Mg, Sc, Y, Mn, Fe, Co, Cu, Zn, Al, Cr, Pb, Sb, V and B). Here, x meets the range of $0<x\leq1.2$, y is within the range of from 0 to 0.9, and z is within the range of from 2.0 to 2.3. The value of x, which represents the molar ratio of lithium, fluctuates upon charge and discharge.

Examples of the olivine-type lithium salt include $LiFePO_4$. Examples of the chalcogen compound include titanium disulfide and molybdenum disulfide. One kind of positive electrode active material may be used singly, or two or more kinds thereof may be used in combination.

Next, the positive electrode material mixture layer and the current collector will be described in detail. The positive electrode material mixture layer includes a positive electrode active material, binder and the like, and is disposed on a current collector. The method of forming the positive electrode material mixture layer is not limited, and may be formed, for example, in the following manner. The positive electrode material mixture layer can be formed by mixing a positive electrode active material, a binder, and other material(s) such as a conductive material or a thickener used as necessary, in a dry process to form a sheet, which is then pressure-bonded to the current collector (dry method). Alternatively, the positive electrode material mixture layer can be formed by dissolving or dispersing, in a dispersion solvent, a positive electrode active material, a binder, and other material(s), such as a conductive material or a thickener used as necessary, to prepare a positive electrode material mixture slurry, which is applied to the current collector and dried (wet method).

For the positive electrode active material, a lithium nickel manganese cobalt complex oxide having a lamellar structure (NMC) is preferably used, as described above. The positive electrode active material is used and mixed in a powdery (granular) form.

Particles of the positive electrode active material such as NMC or sp-Mn may be in the shape of, for example, a lump shape, a polyhedron shape, a spherical shape, an ellipsoidally spherical shape, a plate shape, an acicular shape, or a columnar shape.

The average particle size (d50) of the particles of the positive electrode active material (in a case in which primary particles aggregate to form secondary particles, the average particle size (d50) of the secondary particles), such as NMC or sp-Mn, is preferably from 1 to 30 μm, more preferably from 3 to 25 μm, and further preferably from 5 to 15 μm, from the viewpoints of tap density (fillability) and ease of mixing with other materials in producing an electrode. The average particle size of the particles of the positive electrode active material can be measured in the same manner as in the case of the graphitic particles.

The particles of the positive electrode active material such as NMC and sp-Mn preferably has a BET specific surface area of from 0.2 to 4.0 $m^2/g$, more preferably from 0.3 to 2.5 $m^2/g$, and further preferably from 0.4 to 1.5 $m^2/g$.

When the BET specific surface area of the particles of the positive electrode active material is 0.2 $m^2/g$ or more, excellent battery performance tends to be obtained. When the BET specific surface area of the particles of the positive electrode active material is 4.0 $m^2/g$ or less, tap density tends to increase, and ease of mixing with other materials such as a binder or a conductive material tends to be improved. The BET specific surface area can be measured in the same manner as in the case of graphitic particles.

Examples of the conductive material for the positive electrode include: a metal material, such as copper or nickel; graphite, such as natural graphite or synthetic graphite; carbon black, such as acetylene black; and a carbonaceous material, such as amorphous carbon, such as needle coke. One kind of conductive material may be used singly, or two or more kinds thereof may be used in combination.

The content of the conductive material is preferably from 0.01 to 50% by mass, more preferably from 0.1 to 30% by mass, and further preferably from 1 to 15% by mass, with respect to the mass of the positive electrode material mixture layer. When the content of the conductive material is 0.01% by mass or more, sufficient electrical conductivity tends to be obtained. When the content of the conductive material is 50% by mass or less, decrease in the battery capacity tends to be suppressed.

The binder for the positive electrode is not particularly limited. In a case in which the positive electrode material mixture layer is formed by a wet method, a material having superior solubility or dispersibility in a dispersing solvent is selected. Specific examples thereof include: a resin polymer, such as polyethylene, polypropylene, poly(ethylene terephthalate), polyimide or cellulose; a rubber polymer, such as SBR (styrene-butadiene rubber), NBR (acrylonitrile-butadiene rubber); fluorinated polymer, such as poly(vinylidene fluoride) (PVdF), polytetrafluoroethylene, polytetrafluoroethylene-vinylidene fluoride copolymer or fluorinated poly(vinylidene fluoride); and a polymer composition having ion conductivity of an alkali metal ion (in particular, lithium-ion). One kind of binder for a positive electrode may be used singly, or two or more kinds thereof may be used in combination.

From the viewpoint of the stability of the positive electrode, the binder preferably includes fluorinated polymer such as poly(vinylidene fluoride) (PVdF) or polytetrafluoroethylene-vinylidene fluoride copolymer.

The content of the binder is preferably from 0.1 to 60% by mass, more preferably from 1 to 40% by mass, and further preferably from 3 to 10% by mass, with respect to the mass of the positive electrode material mixture layer.

The binder content of 0.1% by mass or more tends to achieve sufficient binding of the positive electrode active material and sufficient mechanical strength of the positive electrode material mixture layer, and tends to improve battery performance such as cycle characteristics. The binder content of 60% by mass or less tends to achieve a sufficient battery capacity and electrical conductivity.

A thickener is effective in adjusting the viscosity of the slurry. The thickener is not particularly limited, and examples thereof include carboxymethylcellulose, methylcellulose, hydroxymethylcellulose, ethylcellulose, polyvinyl alcohol, oxidized starch, phosphorylated starch, and casein, and salts thereof. One kind of thickener may be used singly, or two or more kinds thereof may be used in combination.

When a thickener is used, the content of the thickener with respect to the mass of the positive electrode material mixture layer is preferably from 0.1 to 20% by mass, more preferably from 0.5 to 15% by mass, and further preferably from 1 to 10% by mass, from the viewpoint of input-output characteristics and the battery capacity.

The type of the dispersion solvent for preparing a slurry is not limited as long as the dispersion solvent is a solvent capable of dissolving or dispersing a positive electrode active material, a binder, and a conductive material, a thickener or the like used as necessary. Either an aqueous solvent or an organic solvent may be used. Examples of the aqueous solvent include water, an alcohol, and a mixed solvent of an alcohol and water. Examples of the organic solvent include N-methyl-2-pyrrolidone (NMP), dimethyl-formamide, dimethylacetamide, methyl ethyl ketone, cyclohexanone, methyl acetate, methyl acrylate, tetrahydrofuran (THF), toluene, acetone, diethyl ether, dimethyl sulfoxide, benzene, xylene, and hexane. A thickener is preferably used particularly when an aqueous solvent is used.

To improve the filling density of the positive electrode active material, the positive electrode material mixture layer formed on the current collector by a wet method or a dry method is preferably consolidated using a hand press, a roller press or the like.

From the viewpoints of further improving input-output characteristics and safety, the consolidated positive electrode material mixture layer preferably has a density in a range of from 2.5 to 3.5 g/cm³, more preferably in a range of from 2.55 to 3.15 g/cm³, and further preferably in a range of from 2.6 to 3.0 g/cm³.

From the viewpoint of energy density and input-output characteristics, the amount of the positive electrode material mixture slurry applied to one side of the current collector when forming the positive electrode material mixture layer is preferably from 30 to 170 g/m², more preferably from 40 to 160 g/m², and further preferably from 40 to 150 g/m², in terms of the solid content of the positive electrode material mixture.

Considering the amount of the positive electrode material mixture slurry applied to one side of a current collector and the density of the positive electrode material mixture layer, the positive electrode material mixture layer preferably has an average thickness of from 19 to 68 μm, more preferably from 23 to 64 μm, and further preferably from 36 to 60 μm. In the present disclosure, an average thickness of a mixture layer refers to an average value of the thicknesses at 10 random points.

The material of the current collector of the positive electrode is not particularly limited. In particular, a metal material is preferable, and aluminum is more preferable. The shape of the current collector is not particularly limited, and a material processed into any shape can be used. Examples of the metal material include a metal foil, a metal plate, a metallic thin film, and an expanded metal. In particular, a metallic thin film is preferably used. The thin film may be formed in a mesh as appropriate.

The average thickness of the current collector is not particularly limited. From the viewpoint of obtaining sufficient strength and favorable flexibility as a current collector, the current collector preferably has an average thickness of from 1 μm to 1 mm, more preferably from 3 to 100 μm, and further preferably from 5 to 100 μm.

(Negative Electrode)

The negative electrode (negative electrode plate) includes a current collector (negative electrode current collector) and a negative electrode material mixture layer disposed on a surface of the current collector. The negative electrode material mixture layer is a layer including at least a negative electrode active material and being disposed on a surface of the current collector. The negative electrode for a lithium-ion secondary battery according to the present disclosure may be used as the negative electrode.

The negative electrode material for a lithium-ion secondary battery according to the present disclosure is used as a negative electrode active material included in the negative electrode material mixture layer in the lithium-ion secondary battery according to the present disclosure.

The content of the negative electrode material for a lithium-ion secondary battery according to the present disclosure is preferably 80% by mass or more, more preferably 85% by mass or more, and further preferably 90% by mass or more, with respect to the total amount of the negative electrode material mixture layer, from the viewpoint of increasing the capacity of the battery.

Next, the negative electrode material mixture layer and the current collector will be described in detail. The negative electrode material mixture layer contains a negative electrode active material, a binder and the like, and is disposed on a current collector. The method of forming the negative electrode material mixture layer is not limited, and the negative electrode material mixture layer is formed, for example, in the following manner. The negative electrode material mixture layer can be formed by dissolving or dispersing, in a dispersion solvent, a negative electrode active material, a binder, and other material(s), such as a conductive material or a thickener used as necessary, to prepare a negative electrode material mixture slurry, which is applied to the current collector and dried (wet method).

As a conductive material for the negative electrode, particles other than the graphitic particles and the carbon particles used for the negative electrode material for a lithium-ion secondary battery according to the present disclosure may be used. For example, graphite such as natural graphite or synthetic graphite, other than the graphitic particles and the carbon particles used in the present disclosure; carbon black, such as acetylene black; amorphous carbon, such as needle coke, or the like may be used. One kind of conductive material for the negative electrode may be used singly, or two or more kinds thereof may be used in combination.

The content of the conductive material with respect to the mass of the negative electrode material mixture layer is preferably from 1 to 45% by mass, more preferably from 2 to 42% by mass, and further preferably from 3 to 40% by mass, from the viewpoints of improving electrical conductivity and reducing the initial irreversible capacity. A content of the conductive material of 1% by mass or more tends to achieve sufficient electrical conductivity. A content of the conductive material of 45% by mass or less tends to suppress deterioration of the battery capacity.

The binder for the negative electrode is not particularly limited as long as the binder is a material that is stable against a non-aqueous electrolytic solution or a dispersion solvent used for forming the electrode. Specific examples thereof include: a resin polymer, such as polyethylene, polypropylene, poly(ethylene terephthalate), cellulose or nitrocellulose; a rubber polymer, such as SBR (styrene-butadiene rubber), or NBR (acrylonitrile-butadiene rubber); fluorinated polymer, such as poly(vinylidene fluoride) (PVdF), polytetrafluoroethylene or fluorinated poly(vinylidene fluoride); and a polymer composition having ion conductivity of an alkali metal ion (in particular, lithium-ion). One kind of binder for a negative electrode may be used singly, or two or more kinds thereof may be used in combination. Among them, SBR or a fluorinated polymer such as poly(vinylidene fluoride) is preferably used.

The content of the binder is preferably from 0.1 to 20% by mass, more preferably from 0.5% to 15% by mass, and further preferably from 0.6 to 10% by mass, with respect to the mass of the negative electrode material mixture layer.

A binder content of 0.1% by mass or more tends to achieve sufficient bonding of the negative electrode active material, and sufficient mechanical strength of the negative electrode material mixture layer. A binder content of 20% by mass or less tends to achieve a sufficient battery capacity and electrical conductivity.

When fluorinated polymer, such as poly(vinylidene fluoride), is used for the binder as a main component, the content of the binder is preferably from 1 to 15% by mass, more preferably from 2 to 10% by mass, and further preferably from 3 to 8% by mass, with respect to the mass of the negative electrode material mixture layer.

A thickener is used for adjusting the viscosity of the slurry. The thickener is not particularly limited, and examples thereof include carboxymethylcellulose, methylcellulose, hydroxymethylcellulose, ethylcellulose, polyvinyl alcohol, oxidized starch, phosphorylated starch, and casein, and salts thereof. One kind of thickener may be used singly, or two or more kinds thereof may be used in combination.

When a thickener is used, the content of the thickener with respect to the mass of the negative electrode material mixture layer is preferably from 0.1 to 5% by mass, more preferably from 0.5 to 3% by mass, and further preferably from 0.6 to 2% by mass, from the viewpoint of input-output characteristic and the battery capacity.

The type of the dispersion solvent for preparing a slurry is not limited as long as the dispersion solvent is a solvent capable of dissolving or dispersing a negative electrode active material, a binder and a conductive material, a thickener or the like used as necessary. Either an aqueous solvent or an organic solvent may be used for the dispersion solvent. Examples of the aqueous solvent include water, an alcohol, and a mixed solvent of an alcohol and water. Examples of the organic solvent include N-methyl-2-pyrrolidone (NMP), dimethylformamide, dimethylacetamide, methyl ethyl ketone, cyclohexanone, methyl acetate, methyl acrylate, tetrahydrofuran (THF), toluene, acetone, diethyl ether, dimethyl sulfoxide, benzene, xylene, and hexane. A thickener is preferably used particularly when an aqueous solvent is used.

The negative electrode material mixture layer preferably has a density of from 0.7 to 2.0 g/cm³, more preferably from 0.8 to 1.9 g/cm³, and further preferably from 0.9 to 1.8 g/cm³.

When the negative electrode material mixture layer has a density of 0.7 g/cm³ or more, electrical conductivity among negative electrode active materials tends to be improved, whereby increase in battery resistance tends to be suppressed and the capacity per unit volume tends to be improved. When the negative electrode material mixture layer has a density of 2.0 g/cm³ or less, the risk of deterioration in discharge characteristics can be lowered, the deterioration in discharge characteristics being caused by increased the initial irreversible capacity and decreased permeability of the electrolytic solution in the vicinity of the interface of the current collector and the negative electrode active material.

From the viewpoint of energy density and input-output characteristics, the amount of the negative electrode material mixture slurry applied to one side of the current collector when forming the negative electrode material mixture layer is preferably from 30 to 150 g/m², more preferably from 40 to 140 g/m², and further preferably from 45 to 130 g/m², in terms of the solid content of the negative electrode material mixture.

Considering the amount of the negative electrode material mixture slurry applied to one side of a current collector and the density of the negative electrode material mixture layer, the negative electrode material mixture layer preferably has an average thickness of from 10 to 150 μm, more preferably from 15 to 140 μm, and further preferably from 15 to 120 μm.

The material for the current collector of the positive electrode is not particularly limited, and examples thereof include a metallic material such as copper, nickel, stainless steel, and nickel-plated steel. Among them, copper is preferable from the viewpoints of the cost and ease of processing.

The shape of the current collector is not particularly limited, and a material processed into any shape can be used. Examples thereof include a metal foil, a metal plate, a metallic thin film and an expanded metal. Among them, a metal thin film is preferable, and a copper foil is more preferable. Examples of the copper foil include a stretched copper foil formed by a rolling method and an electrolytic copper foil formed by an electrolytic method, each of which is preferable for the current collector.

The average thickness of the current collector is not particularly limited, and is preferably, for example, from 5 to 50 μm, more preferably from 8 to 40 μm, and further preferably from 9 to 30 μm.

When the average thickness of the current collector is less than 25 μm, the current collector can be strengthened by using strong copper alloy (phosphor bronze, copper-titanium alloy, Corson alloy, Cu—Cr—Zr alloy or the like) instead of pure copper.

(Non-Aqueous Electrolytic Solution)

A non-aqueous electrolytic solution may include a non-aqueous solvent and a lithium salt (an electrolyte).

First, the non-aqueous solvent will be described.

Examples of the non-aqueous solvent include a cyclic carbonate, a chain carbonate and a cyclic sulfonate ester.

For the cyclic carbonate, a cyclic carbonate having a $C_{2-6}$ alkylene group constituting the cyclic carbonate is preferable, and a cyclic carbonate having a $C_{2-4}$ alkylene group constitugint the cyclic carbonate is more preferable. Examples thereof include ethylene carbonate, propylene carbonate, and butylene carbonate. Among them, ethylene carbonate or propylene carbonate is preferable.

For the chain carbonate, a dialkyl carbonate is preferable, and a dialkyl carbonate having two $C_{1-5}$ alkyl groups is preferable, and a dialkyl carbonate having two $C_{1-4}$ alkyl groups is more preferable. Examples thereof include: a symmetric chain carbonate, such as dimethyl carbonate, diethyl carbonate, or di-n-propyl carbonate; and an asymmetric chain carbonate, such as ethylmethyl carbonate, methyl-n-propyl carbonate, or ethyl-n-propyl carbonate. Among them, dimethyl carbonate or ethylmethyl carbonate is preferable. Dimethyl carbonate is superior to diethyl carbonate in oxidation resistance and reduction resistance, and therefore tends to be able to improve cycle characteristics. Ethylmethyl carbonate has an asymmetrical molecular structure and a low melting point, and therefore tends to be able to improve low-temperature characteristics. A mixed solvent in which ethylene carbonate, dimethyl carbonate, and ethylmethyl carbonate are combined is particularly preferable from the viewpoint that the mixed solvent can ensure battery performance in a wide temperature range.

From the viewpoint of battery performance, the content of the cyclic carbonate and the chain carbonate is preferably 85% by mass or more, more preferably 90% by mass or more, and further preferably 95% by mass or more, with respect to the total amount of the non-aqueous solvent.

When a cyclic carbonate and a chain carbonate are used in combination, the mixing ratio between the cyclic carbonate and the chain carbonate, that is, cyclic carbonate/chain carbonate (volume ratio) is preferably from 1/9 to 6/4, and more preferably from 2/8 to 5/5, from the viewpoint of battery performance.

Examples of the cyclic sulfonate ester include 1,3-propanesultone, 1-methyl-1,3-propanesultone, 3-methyl-1,3-propanesultone, 1,4-butanesultone, 1,3-propenesultone, and 1,4-butenesultone. Among them, 1,3-propanesultone or 1,4-butanesultone is particularly preferable from the viewpoint of being able to reduce direct-current resistance.

The non-aqueous electrolytic solution may further include a chain ester, a cyclic ether, a chain ether, a cyclic sulfone or the like.

Examples of the chain ester include methyl acetate, ethyl acetate, propyl acetate, and methyl propionate. Among them, methyl acetate is preferably used from the viewpoint of improving low-temperature characteristics.

Examples of the cyclic ether include tetrahydrofuran, 2-methyltetrahydrofuran, and tetrahydropyran.

Examples of the chain ether include dimethoxyethane and dimethoxymethane.

Examples of the cyclic sulfone include sulfolane and 3-methylsulfolane.

The non-aqueous electrolytic solution may contain a silyl phosphate ester compound.

Specific examples of the silyl phosphate ester compound include tris(trimethylsilyl)phosphate, dimethyl trimethylsilyl phosphate, methyl bis(trimethylsilyl)phosphate, diethyl trimethylsilyl phosphate, ethyl bis(trimethylsilyl)phosphate, dipropyl trimethylsilyl phosphate, propyl bis(trimethylsilyl) phosphate, dibutyl trimethylsilyl phosphate, butyl bis(trimethylsilyl)phosphate, dioctyl trimethylsilyl phosphate, octyl bis(trimethylsilyl)phosphate, diphenyl trimethylsilyl phosphate, phenyl bis(trimethylsilyl)phosphate, di(trifluoroethyl) (trimethylsilyl)phosphate, trifluoroethyl bis(trimethylsilyl) phosphate, a compound in which a trimethylsilyl group of the above-described silyl phosphate ester is substituted with a triethylsilyl group, a triphenylsilyl group, a t-butyldimethylsilyl group or the like, and a compound having a so-called condensed phosphate ester structure in which phosphate esters are condensed with phosphorus atoms being bonded via an oxygen.

Among them, tris(trimethylsilyl)phosphate (TMSP) is preferably used. Tris(trimethylsilyl)phosphate can suppress increase in resistance in relatively smaller addition amount as compared to other phosphate esters.

One kind of silyl phosphate ester may be used singly, or two or more kinds thereof may be used in combination.

When the non-aqueous electrolytic solution includes a silyl phosphate ester compound, the content of the silyl phosphate ester compound is preferably from 0.1 to 5% by mass, more preferably from 0.3 to 3% by mass, and further preferably from 0.4 to 2% by mass, with respect to the total amount of the non-aqueous electrolytic solution.

In particular, when the non-aqueous electrolytic solution includes tris(trimethylsilyl)phosphate (TMSP), the content of tris(trimethylsilyl)phosphate (TMSP) is preferably from 0.1 to 0.5% by mass, more preferably from 0.1 to 0.4% by mass, and further preferably from 0.2 to 0.4% by mass, with respect to the total amount of the non-aqueous electrolytic solution. When the content of TMSP is within the above range, life characteristics tend to be improved by the function of a thin solid electrolyte interphase (SEI) or the like.

The non-aqueous electrolytic solution may include vinylene carbonate (VC). When VC is used, a stable coating is formed over the surface of the negative electrode when the lithium-ion secondary battery is charged. The coating has an effect of suppressing the decomposition of the non-aqueous electrolytic solution at the surface of the negative electrode.

The content of vinylene carbonate is preferably from 0.3 to 1.6% by mass, more preferably from 0.3 to 1.5% by mass, and further preferably from 0.3 to 1.3% by mass, with respect to the total amount of the non-aqueous electrolytic solution. When the content of vinylene carbonate is within the above range, life characteristics tend to be improved, and there tends to be a lower possibility that excessive VC is degraded during the charging and discharging of the lithium-ion secondary battery whereby charge-discharge efficiency is lowered.

Next, a lithium salt (electrolyte) will be described.

The lithium salt is not particularly limited as long as the lithium salt can be used as an electrolyte of a non-aqueous electrolytic solution for a lithium-ion secondary battery, and examples thereof include an inorganic lithium salt, a fluorine-containing organic lithium salt, and an oxalatoborate salt described below.

Examples of the inorganic lithium salt include an inorganic fluoride salt, such as $LiPF_6$, $LiBF_4$, $LiAsF_6$, or $LiSbF_6$, a perhalate, such as $LiClO_4$, $LiBro_4$, or $LiIO_4$, and an inorganic chloride salt, such as $LiAlCl_4$.

Examples of the fluorine-containing organic lithium salt include: a perfluoroalkanesulfonate salt, such as $LiCF_3SO_3$; a perfluoroalkanesulfonylimide salt, such as $LiN(CF_3SO_2)_2$, $LiN(CF_3CF_2SO_2)_2$, or $LiN(CF_3SO_2)(C_4F_9SO_2)$; a perfluoroalkanesulfonylmethide salt, such as $LiC(CF_3SO_2)_3$; and a fluoroalkylfluorophosphate salt, such as $Li[PF_5(CF_2CF_2CF_3)]$, $Li[PF_4(CF_2CF_2CF_3)_2]$, $Li[PF_3(CF_2CF_2CF_3)_3]$, $Li[PF_5(CF_2CF_2CF_2CF_3)]$, $Li[PF_4(CF_2CF_2CF_2CF_3)_2]$, or $Li[PF_3(CF_2CF_2CF_2CF_3)_3]$.

Examples of the oxalatoborate salt include lithium bis (oxalato) borate and lithium difluorooxalatoborate.

One kind of lithium salt may be used singly, or two or more kinds thereof may be used in combination. Considering comprehensive characteristics such as solubility in a solvent, or charge-discharge characteristics, output characteristics, cycle characteristics and the like of the lithium-ion secondary battery, lithium hexafluorophosphate ($LiPF_6$) is particularly preferable.

The concentration of the electrolyte in the non-aqueous electrolytic solution is not particularly limited. The concentration of the electrolyte is preferably 0.5 mol/L or more, more preferably 0.6 mol/L or more, and further preferably 0.7 mol/L or more. The concentration of the electrolyte is preferably 2 mol/L or less, more preferably 1.8 mol/L or less, and further preferably 1.7 mol/L or less. When the concentration of the electrolyte is 0.5 mol/L or more, sufficient electrical conductivity tends to be obtained. When the concentration of the electrolyte is 2 mol/L or less, increase in the viscosity of the non-aqueous electrolytic solution tends to be suppressed, whereby electrical conductivity tends to be increased. By the increase in the electrical conductivity of the non-aqueous solvent, the lithium-ion secondary battery tends to have improved properties.

(Separator)

The separator is not particularly limited as long as the separator has ion permeability while being able to electronically insulate the positive electrode and the negative electrode, and is resistant to oxidizing environment near the positive electrode and to reducing environment near the negative electrode. Examples of the material for the separator satisfying such characteristics include a resin, an inorganic material or the like.

For the resin, an olefinic polymer, a fluorinated polymer, a cellulosic polymer, polyimide, nylon or the like are used.

The material is preferably selected from materials which are stable against a non-aqueous electrolyte solution and has an excellent solution retention. A porous sheet or a nonwoven fabric made from a polyolefin, such as polyethylene or polypropylene, is preferably used.

For the inorganic material, an oxide, such as alumina or silicon dioxide; a nitride, such as aluminum nitride or silicon nitride; a glass, or the like are used. For example, an inorganic material in a fibrous or particle shape formed in a nonwoven fabric or a woven fabric, or disposed on a thin film-shaped substrate such as a microporous film, may be used as a separator. For the thin film-shaped substrate, a substrate having a pore diameter of from 0.01 to 1 μm and a thickness of from 5 to 50 μm is favorably used. Further, a complex porous layer formed from the inorganic material having a fibrous or particle shape using a binder, such as a resin, may also be used as a separator. The complex porous layer may also be formed on a surface of another separator to produce a multilayer separator. The complex porous layer may be formed on a surface of the positive electrode or the negative electrode to function as a separator.

(Other Constituent Members)

The lithium-ion secondary battery may include other constituent member(s). For example, the lithium-ion secondary battery may be provided with a cleavage valve. The cleavage valve opens to suppress the pressure increase inside the battery, thereby improving its safety.

Further, a constituent member that releases an inert gas, such as carbon dioxide, in response to a temperature increase may also be provided. Providing such a constituent member enables prompt opening of the cleavage valve through the generation of the inert gas in response to a temperature increase inside the battery, thereby improving its safety. For the material of the above constituent member, lithium carbonate, polyethylene carbonate, polypropylene carbonate or the like is preferable.

(Lithium-Ion Secondary Battery)

An embodiment in which the present disclosure is applied to a 18650-type columnar lithium-ion secondary battery will now be described with reference to the drawing. FIG. 1 is a perspective cross-sectional view illustrating a lithium-ion secondary battery in an embodiment of the present disclosure.

As illustrated in FIG. 1, a lithium-ion secondary battery 1 according to the present disclosure includes a battery container 6, which is made of nickel-plated steel and which has a bottomed cylindrical shape. In the battery container 6, rolled electrodes 5 is housed, the rolled electrodes 5 being obtained by cross-sectionally spirally rolling up a belt-shaped positive electrode plate 2 and a negative electrode plate 3 with a separator 4, which is a polyethylene porous sheet, placed therebetween. The separator 4 has, for example, the width of 58 mm and the average thickness of 30 μm. At the upper surface of the rolled electrodes 5, a ribbon-shaped positive electrode tab terminal made of aluminum and fixed to the positive electrode plate 2 at one end is extended out. The other end of the positive electrode tab terminal is joined to the lower side of a disc-shaped battery lid, which is a positive electrode external terminal disposed over the rolled electrodes 5, by ultrasonic welding. On the other hand, at the lower side of the rolled electrodes 5, a ribbon-shaped negative electrode tab terminal made of copper and fixed to the negative electrode plate 3 at one end is extended out. The other end of the negative electrode tab terminal is joined to the bottom inner face of the battery container 6 by resistance welding. Accordingly, the positive electrode tab terminal and the negative electrode tab terminal are extended out from both ends of the rolled electrodes 5 in opposite directions. In the entire periphery of the rolled electrodes 5, an insulating coating is provided, although it is not illustrated. The battery lid is swaged and fixed to the upper portion of the battery container 6 via a gasket made of an insulating resin. Therefore, the lithium-ion secondary battery 1 is sealed. A non-aqueous electrolytic solution, which is not illustrated, has been injected inside the battery container 6.

(Method of Producing Negative Electrode for Lithium-Ion Secondary Battery)

A method of producing a negative electrode for a lithium-ion secondary battery according to the present disclosure includes: preparing a negative electrode material mixture including: graphitic particles having a standard deviation of degree of circularity of from 0.05 to 0.10 in a range in which a cumulative frequency of degree of circularity from a lower degree of circularity is from 10% by particle to 90% by particle in a cumulative frequency distribution with respect to a degree of circularity obtained using a flow-type particle analyzer; and carbon particles having an average degree of circularity of 0.94 or less, the average degree of circularity being obtained using a flow-type particle analyzer; and disposing the negative electrode material mixture on a surface of a current collector.

The graphitic particles and the carbon particles in the method of producing a negative electrode for a lithium-ion secondary battery according to the present disclosure may be those described in detail as the graphitic particles and the carbon particles used for the negative electrode. The negative electrode material mixture may be one described in detail as the negative electrode material mixture used for the lithium-ion secondary battery.

The negative electrode material mixture may be prepared by mixing the above-described specific graphitic particles and specific carbon particles, or may be prepared by using a negative electrode material in which the above-described specific graphitic particles and specific carbon particles have been premixed. Details of the current collector and the negative electrode material mixture are as described above. The method for disposing the negative electrode material mixture on the current collector is not particularly limited, and may be performed by, in an embodiment, forming the negative electrode material mixture on the current collector as described above.

EXAMPLES

Embodiments of the present disclosure will be described in detail by way of Examples. However, embodiments of the present disclosure are not limited by the following Examples.

Example 1

[Preparation of Positive Electrode Plate]

A positive electrode plate was prepared in the following manner. $LiNi_{1/3}Mn_{1/3}Co_{1/3}O_2$ having a BET specific surface area of 0.4 m²/g and a volume average particle diameter (d50) of 6.5 μm was used as a positive electrode active material. Acetylene black as a conductive material (trade name; HS-100, Denka Company Limited, volume average particle diameter: 48 nm; value on a catalog provided by Denka Company Limited) and polyvinylidene fluoride as a binder were sequentially added to the positive electrode active material and mixed to obtain a mixture of a positive electrode material. The mass ratio of the positive electrode active material, the conductive material and the binder (positive electrode active material:conductive material: binder) was 80:13:7. Further, N-methyl-2-pyrrolidone (NMP) as a dispersion solvent was added to the mixture, and the mixture was kneaded to obtain a slurry. The slurry was substantially uniformly and homogenously applied to both faces of an aluminum foil having an average thickness of 20 μm, which is a current collector of the positive electrode. Thereafter, the positive electrode material mixture layer was subjected to a drying treatment and was consolidated to a density of 2.7 g/cm³.

[Preparation of Negative Electrode Plate]

A negative electrode plate was prepared in the following manner.

Graphitic particles having a volume average particle diameter (d50), a standard deviation of degree of circularity in a range in which a cumulative frequency of degree of circularity from lower circularity is from 10% by particle to 90% by particle (standard deviation of degree of circularity), degree of circularity at the cumulative frequency of 10% by particle (degree of circularity at 10% by particle), a Raman R value (R value), and a BET specific surface area (BET) shown in Table 1 were used as graphitic particles (interplanar spacing $d_{002}$ in C-axis direction=0.336 nm).

Natural graphite having an average degree of circularity and a volume average particle diameter (d50) shown in Table 1 was used as carbon particles.

Carboxymethyl cellulose (CMC) as a thickener and styrene-butadiene rubber (SBR) as a binder were added to a negative electrode active material prepared by mixing the above graphitic particles and carbon particles. The mass ratio of the negative electrode active material, CMC and SBR (negative electrode active material: CMC:SBR) was 98:1:1. Purified water was added thereto as a dispersion solvent, and the mixture was kneaded to obtain a slurry for respective Examples and Comparative Examples. The slurry was substantially uniformly and homogenously applied to both faces of a stretched copper film having an average thickness of 10 μm, which is a current collector of the negative electrode. The density of the negative electrode material mixture layer was adjusted to 1.3 g/cm³.

[Production of Lithium-Ion Secondary Battery (Single Electrode)]

The prepared negative electrode plate was punched into a disk shape of 14 mm in diameter to obtain a sample electrode (negative electrode).

The produced sample electrode (negative electrode), a separator, and an opposite electrode (positive electrode) were housed in a coin-shaped battery container in this order, and electrolytic solution was poured therein to produce a coin-shaped lithium-ion secondary battery. For the electrolytic solution, a mixture in which lithium hexafluorophosphate (LiPF₆) was dissolved in a mixed solvent of ethylene carbonate (EC) and ethylmethyl carbonate (EMC) (volume ratio of EC and EMC was 3:7) in a concentration of 1.0 mol/L was used. For the opposite electrode (positive electrode), metallic lithium was used. For the separator, a polyethylene microporous film having a thickness of 20 μm was used.

[Evaluation of Initial Charge-Discharge Efficiency]

The initial charge-discharge efficiency was evaluated using the produced lithium-ion secondary battery in the following manner.

(1) The battery was charged at a constant current of 0.48 mA until the voltage reached 0 V (V vs. Li/Li⁺), and thereafter, the battery was charged at a constant voltage at 0 V until the current value reached 0.048 mA. The obtained capacity was defined as the initial charge capacity.

(2) After a 30 minutes' resting period, the battery was discharged at a constant current of 0.48 mA until the voltage reached 1.5 V (V vs. Li/Li⁺). The capacity obtained was defined as the initial discharge capacity.

(3) Initial charge-discharge efficiency was calculated using the charge and discharge capacities obtained in (1) and (2) by the following formula 1.

$$\text{Initial charge-discharge efficiency (\%)}=(\text{Initial discharge capacity/initial charge capacity})\times100 \quad \text{(Formula 1)}$$

[Production of Lithium-Ion Secondary Battery]

The above-described positive electrode plate and negative electrode plate were cut into a predetermined size respectively, and a polyethylene monolayer separator having an average thickness of 30 μm (trade name: HIPORE, manufactured by Asahi Kasei Corporation; HIPORE is a registered trademark) was placed between the cut-out positive electrode and negative electrode, which was then rolled up to obtain a rolled electrode body. The lengths of the positive electrode, negative electrode and the separator were adjusted such that the diameter of the electrode body became 17.15 mm. Leads for current collection were provided on the electrode body, and the electrode body was then inserted in a 18650-type battery case, to which a non-aqueous electrolytic solution was injected. For the non-aqueous electrolytic solution, a mixture in which lithium hexafluorophosphate (LiPF₆) as a lithium salt (electrolyte) was dissolved in a mixed solvent of ethylene carbonate (EC), which is a cyclic carbonate, dimethyl carbonate (DMC), which is a chain carbonate, and ethylmethyl carbonate (EMC) (volume ratio of EC, DMC and EMC was 2:3:2), in a concentration of 1.2 mol/L, and in which vinylene carbonate (VC) was further added in a concentration of 1.0% by mass, was used. Lastly, the battery was sealed, whereby a lithium-ion secondary battery was produced.

[Initial Condition]

The produced lithium-ion secondary battery was placed under the environment of 25° C., and was charged at a constant current of 0.5 C until the voltage reached 4.2 V, and once the voltage reached 4.2 V, the battery was charged at a constant voltage at this voltage until the current value reached 0.01 C. Thereafter, the battery was discharged at a constant current of 0.5 C until the voltage reached 2.7 V. This cycle was repeated three times. Between the respective charging and discharging processes, the battery was rested for 30 minutes. The lithium-ion secondary battery after the three cycles is referred to as the "initial condition". The discharge capacity after the three cycles is defined as "Discharge Capacity1".

[Evaluation of Pulse Charge Characteristics]

Pulse charge characteristics were assessed based on the condition of Li precipitation. A battery in the initial condition was left stand in a thermostatic tank set at −30° C. for 5 hours such that the interior of the battery reached near the atmospheric temperature. Thereafter, the battery was charged at 20 A, which corresponds to the current of 20 C, for 5 minutes. After that, the battery was disassembled, and the condition of Li precipitation was observed using a scanning electron microscope (SEM) (SU3500, manufactured by Keyence Corporation). The results were shown in Table 1. When Li precipitation was not observed, the battery was regarded as having excellent pulse charge characteristics.

[Evaluation of Cycle Characteristics]

A battery in the initial condition was placed under the environment at 25° C., and was charged at a constant current of 1 C until the voltage reached 4.2 V, and once the voltage reached 4.2 V, the battery was charged at a constant voltage at this voltage until the current value reached 0.01 C. Thereafter, the battery was discharged at a constant current of 1 C until the voltage reached 2.7 V. This cycle was repeated 100 times. Between the respective charging and discharging processes, the battery was rested for 30 minutes. Next, the battery was placed under the environment at 25° C. and was charged at a constant current of 0.5 C until the voltage reached 4.2 V, and once the voltage reached 4.2 V, the battery was charged at a constant voltage at this voltage until the current value reached 0.01 C. After a 30 minutes' resting period, the battery was discharged at a constant current of 0.5 C until the voltage reached 2.7 V. The obtained discharge capacity is defined as "Discharge Capacity 2".

Cycle characteristics are calculated by the following formula.

$$\text{Cycle characteristics(Capacity ratio (\%))}=(\text{Discharge Capacity 2(mAh)/Discharge Capacity 1(mAh)})\times 100$$

voltage reached 2.7 V. The obtained discharge capacity is defined as "Discharge Capacity 3". Storage characteristics were evaluated in the following manner.

$$\text{Storage characteristics (\%)}=(\text{Discharge Capacity 3(mAh))/(Discharge Capacity 1(mAh))}\times 100$$

Examples 2 to 7 and Comparative Examples 1 and 3 to 5

Negative electrode materials were prepared and evaluations were performed in the same manner as in Example 1, except that the carbon particles were replaced with natural graphite having a degree of circularity and a volume average particle diameter shown in Table 1.

Comparative Example 2

A negative electrode material was prepared, and evaluations were performed in the same manner as in Example 1, except that the carbon particles were replaced with carbon black having a degree of circularity and a volume average particle diameter shown in Table 1.

TABLE 1

| | Graphitic particles | | | | Carbon particles | | Initial | | | | |
|---|---|---|---|---|---|---|---|---|---|---|---|
| | d50 (μm) | standard deviation of degree of circularity | R value | BET (m²/g) | Average degree of circularity | d50 (μm) | Mass ratio graphitic particles: carbon particles | charge-discharge efficiency (%) | Pulse charge characteristics Li precipitation | Cycle characteristics (%) | High temperature characteristics (%) |
| Example 1 | 10.2 | 0.08 | 0.37 | 4.2 | 0.90 | 3.5 | 90:10 | 92.8 | Not observed | 96 | 92 |
| Example 2 | 10.2 | 0.08 | 0.37 | 4.2 | 0.92 | 3.5 | 90:10 | 93.2 | Not observed | 94 | 94 |
| Example 3 | 10.2 | 0.08 | 0.37 | 4.2 | 0.85 | 3.5 | 90:10 | 92.8 | Not observed | 97 | 93 |
| Example 4 | 10.2 | 0.08 | 0.37 | 4.2 | 0.90 | 1 | 90:10 | 91.4 | Not observed | 97 | 90 |
| Example 5 | 10.2 | 0.08 | 0.37 | 4.2 | 0.90 | 15 | 90:10 | 93.9 | Not observed | 90 | 94 |
| Example 6 | 10.2 | 0.05 | 0.38 | 4.2 | 0.90 | 3.5 | 90:10 | 93.1 | Not observed | 94 | 93 |
| Example 7 | 10.2 | 0.10 | 0.36 | 4.2 | 0.90 | 3.5 | 90:10 | 92.7 | Not observed | 95 | 93 |
| Comparative Example 1 | 10.2 | 0.08 | 0.37 | 4.2 | 0.95 | 3.5 | 90:10 | 93.5 | Not observed | 82 | 94 |
| Comparative Example 2 | 10.2 | 0.08 | 0.37 | 4.2 | 0.98 | 3.5 | 90:10 | 89.9 | Not observed | 91 | 81 |
| Comparative Example 3 | 10.4 | 0.04 | 0.37 | 4.0 | 0.90 | 3.5 | 90:10 | 92.5 | Observed | 89 | 76 |
| Comparative Example 4 | 10.2 | 0.15 | 0.37 | 4.1 | 0.90 | 3.5 | 90:10 | 91.1 | Not observed | 88 | 78 |
| Comparative Example 1 | 10.2 | 0.04 | 0.37 | 4.0 | 0.95 | 3.5 | 90:10 | 92.4 | Observed | 82 | 90 |

[High Temperature Characteristics (Storage Characteristics)]

A battery in the initial condition was placed under the environment at 25° C. and was charged at a constant current of 0.5 C until the voltage reached 4.2 V, and once the voltage reached 4.2 V, the battery was charged at a constant voltage at this voltage until the current value reached 0.01 C. After that, the battery was left stand under the environment of 60° C. for 90 days. The battery that had been left stand was then left stand under the environment of 25° C. for 6 hours, and was discharged at a constant current of 0.5 C until the voltage reached 2.7 V. Next, the battery was charged at a constant current of 0.5 C until the voltage reached 4.2 V, and once the voltage reached 4.2 V, the battery was charged at a constant voltage at this voltage until the current value reached 0.01 C. After a 30 minutes' resting period, the battery was discharged at a constant current of 0.5 C until the As is clear from Table 1, lithium-ion secondary batteries in which a negative electrode material for a lithium-ion secondary battery according to the present disclosure was used had excellent pulse charging characteristics, cycle characteristics and high temperature characteristics. Further, lithium-ion secondary batteries in which a negative electrode material for lithium-ion secondary battery according to the present disclosure was used were also excellent in the initial charge-discharge efficiency.

All documents, patent applications, and technical standards described in the present disclosure are herein incorporated by reference to the same extent as if each individual document, patent application, or technical standard was specifically and individually indicated to be incorporated by reference.

REFERENCE SIGNS LIST

1 Lithium-ion secondary battery
2 Positive electrode plate
3 Negative electrode plate
4 Separator
5 Rolled electrodes
6 Battery container

What is claimed is:

1. A negative electrode material for a lithium-ion secondary battery, the negative electrode material comprising:

graphitic particles that are synthetic graphite particles produced by a process including burning a raw material comprising at least one selected from the group consisting of a resin material and a pitch-based material, the graphitic particles having an average degree of circularity of 0.85 or more and having a standard deviation of degree of circularity of from 0.05 to 0.10 in a range in which a cumulative frequency of degree of circularity from a lower degree of circularity is from 10% by particle to 90% by particle in a cumulative frequency distribution with respect to a degree of circularity obtained using a flow-type particle analyzer; and carbon particles that are natural graphite particles having an average degree of circularity of from 0.90 to 0.94, the average degree of circularity being obtained using a flow-type particle analyzer.

2. The negative electrode material for a lithium-ion secondary battery according to claim 1, wherein the graphitic particles have a degree of circularity of from 0.70 to 0.91 at the cumulative frequency of 10% by particle.

3. The negative electrode material for a lithium-ion secondary battery according to claim 1, wherein the graphitic particles have a volume average particle diameter of from 2 to 30 μm.

4. The negative electrode material for a lithium-ion secondary battery according to claim 1, wherein the carbon particles have a volume average particle diameter of from 0.5 to 15 μm.

5. The negative electrode material for a lithium-ion secondary battery according to claim 1, wherein the carbon particles have a smaller volume average particle diameter than a volume average particle diameter of the graphitic particles.

6. The negative electrode material for a lithium-ion secondary battery according to claim 1, wherein a ratio of volume average particle diameters between the graphitic particles and the carbon particles (graphitic particles:carbon particles) is from 10:0.5 to 10:5.

7. The negative electrode material for a lithium-ion secondary battery according to claim 1, wherein the graphitic particles have a Raman R value of from 0.10 to 0.60, the R value representing a ratio (ID/IG) of a peak intensity observed in a range of from $1300 \, \text{cm}^{-1}$ to $1400 \, \text{cm}^{-1}$ (ID) to a peak intensity observed in a range of from $1580 \, \text{cm}^{-1}$ to $1620 \, \text{cm}^{-1}$ (IG) in Raman spectrometry, the graphitic particles being irradiated with a laser light at 532 nm.

8. The negative electrode material for a lithium-ion secondary battery according to claim 1, wherein a mass ratio between the graphitic particles and the carbon particles (graphitic particles:carbon particles) is from 51:49 to 99:1.

9. A negative electrode for a lithium-ion secondary battery, the negative electrode comprising:

a current collector; and a negative electrode material mixture layer disposed on a surface of the current collector, the negative electrode material mixture layer comprising:

graphitic particles that are synthetic graphite particles produced by a process including burning a raw material comprising at least one selected from the group consisting of a resin material and a pitch-based material, the graphitic particles having an average degree of circularity of 0.85 or more and having a standard deviation of degree of circularity of from 0.05 to 0.10 in a range in which a cumulative frequency of degree of circularity from a lower degree of circularity is from 10% by particle to 90% by particle in a cumulative frequency distribution with respect to a degree of circularity obtained using a flow-type particle analyzer; and carbon particles that are natural graphite particles having an average degree of circularity of from 0.90 to 0.94, the average degree of circularity being obtained using a flow-type particle analyzer.

10. A lithium-ion secondary battery comprising the negative electrode for a lithium-ion secondary battery according to claim 9.

11. A method of producing a negative electrode for a lithium-ion secondary battery, the method comprising:

preparing a negative electrode material mixture comprising:

graphitic particles that are synthetic graphite particles produced by a process including burning a raw material comprising at least one selected from the group consisting of a resin material and a pitch-based material, the graphitic particles having an average degree of circularity of 0.85 or more and having a standard deviation of degree of circularity of from 0.05 to 0.10 in a range in which a cumulative frequency of degree of circularity from a lower degree of circularity is from 10% by particle to 90% by particle in a cumulative frequency distribution with respect to a degree of circularity obtained using a flow-type particle analyzer; and carbon particles that are natural graphite particles having an average degree of circularity of from 0.90 to 0.94, the average degree of circularity being obtained using a flow-type particle analyzer; and disposing the negative electrode material mixture on a surface of a current collector.

* * * * *